(12) United States Patent

Pradier et al.

(10) Patent No.: US 6,959,596 B2
(45) Date of Patent: Nov. 1, 2005

(54) INSTALLATION FOR MEASURING PRESSURE OF AT LEAST ONE AEROPLANE WHEEL TIRE

(75) Inventors: Jean-Clair Pradier, Houilles (FR); Antoine Gautier, Thury-Harcourt (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 10/473,808

(22) PCT Filed: Mar. 27, 2002

(86) PCT No.: PCT/FR02/01074

§ 371 (c)(1),
(2), (4) Date: Jul. 29, 2004

(87) PCT Pub. No.: WO02/078985

PCT Pub. Date: Oct. 10, 2002

(65) Prior Publication Data

US 2005/0066718 A1 Mar. 31, 2005

(30) Foreign Application Priority Data

Mar. 29, 2001 (FR) .............................. 01 04292

(51) Int. Cl.⁷ .............................................. B60C 23/02
(52) U.S. Cl. ................................................... 73/146.5
(58) Field of Search .......................... 73/146, 146.2, 73/146.3, 146.5, 146.8; 340/442–447

(56) References Cited

U.S. PATENT DOCUMENTS

| 4,048,614 | A | * | 9/1977 | Shumway | .................... 340/447 |
| 4,072,926 | A | * | 2/1978 | Shimahara et al. | ......... 340/448 |
| 4,630,470 | A | * | 12/1986 | Brooke et al. | ............. 73/146.2 |
| 4,695,823 | A | | 9/1987 | Vernon | |
| 5,587,698 | A | * | 12/1996 | Genna | ........................ 340/442 |
| 5,600,301 | A | | 2/1997 | Robinson, III | |
| 5,853,020 | A | * | 12/1998 | Widner | ....................... 137/227 |

FOREIGN PATENT DOCUMENTS

EP          0 301 127       2/1989

* cited by examiner

Primary Examiner—William Oen
(74) Attorney, Agent, or Firm—Young & Thompson

(57) ABSTRACT

An installation for measuring the pressure of at least one tire of a wheel of an aeroplane includes: at least a pressure measuring sensor associated with a tire; a unit operating on the pressure measurement provided in the aeroplane; and radio-frequency transmission elements including for the or each sensor, a revolving antenna borne by the wheel and connected to each measuring sensor and to a fixed antenna connected by a conductive cable to the unit operating on the pressure measurement. The fixed antenna is adapted to be borne by the aeroplane structure away from the or each wheel at least in an upper part of the shock strut of the landing gear bearing the wheel.

7 Claims, 2 Drawing Sheets

INSTALLATION FOR MEASURING PRESSURE OF AT LEAST ONE AEROPLANE WHEEL TIRE

BACKGROUND OF THE INVENTION

The present invention relates to an installation for measuring the pressure of at least one tyre of an aeroplane wheel, of the type comprising:

at least one pressure measuring sensor associated with a tyre;

a unit for operating on the pressure measurement provided in the aeroplane; and radio-frequency transmission means comprising on the one hand, for the or each sensor, a revolving antenna borne by the wheel and connected to each measuring sensor and, on the other hand, a fixed antenna connected by a conductive cable to the unit for operating on the pressure measurement.

DESCRIPTION OF THE RELATED ART

In aircraft it is useful for the cockpit to know the pressure of the tyres on the landing gear wheels.

To this end it is known to mount, on the rim of each wheel, a pressure sensor adapted to measure the inflation pressure of the tyre carried by the rim.

This pressure sensor sends the measurement to an operating unit provided in the body of the aircraft, and particularly in the cockpit. This operating unit is adapted, for example, to provide the pilot with a display on a suitable screen showing the digital value of the pressure of each tyre.

To ensure that the data is transmitted from the sensor to the cockpit it is known to provide data transmission means between the fixed parts and moving parts of the landing gear.

In particular, it is known to provide, on the hub of the wheel and on the wheel axle about which the hub is mounted to rotate, two concentric coils together forming a transformer. The coil borne by the hub is connected to the pressure sensor while the coil borne by the wheel axle is connected to the data processing unit.

The signal supplied by the sensor to the coil borne by the hub and corresponding to the level of pressure in the tyre induces a signal in the coil borne by the wheel axle of the landing gear. This signal is analysed by the operating unit in order to derive from it the pressure in the tyre and make this available to the crew.

This solution works in a satisfactory manner. However, the presence of two concentric coils makes the arrangement relatively bulky.

It has been envisaged to use antennas to provide a radio-frequency transmission between the moving part of the landing gear and the fixed part.

In the installations envisaged, an antenna borne by the fixed part of the landing gear is disposed on the hub of each wheel facing a corresponding rotary antenna borne by the moving part of the wheel.

The fixed antenna carried by the hub is connected to the unit for operating on the values, which is situated in the cockpit, by a data transmission cable.

Thus, the cable passes from the wheel hub along the length of the shock strut of the landing gear then into the fuselage of the aeroplane.

In large aircraft, the shock strut of each element of the landing gear comprises two successive sections connected to each other via a shock absorber.

With the two successive sections rendered movable by the presence of the shock absorber, the passage of the data transmission cable in the region of the shock absorber is tricky. In particular, the cable is subjected to repeated mechanical stresses causing accidental breakage of the transmission cable in this region.

SUMMARY OF THE INVENTION

The invention sets out to propose an installation for measuring the tyre pressures of an aircraft which does not have the drawbacks described above and which is more reliable.

To this end, the invention relates to an installation for measuring the pressure of at least one tyre of an aeroplane wheel, of the type described above, characterised in that the fixed antenna is adapted to be borne by the structure of the aeroplane at a spacing from the or each wheel, at least in an upper part of the shock strut of an element of the landing gear carrying the wheel.

According to particular embodiments, the installation comprises one or more of the following features:

the shock strut has two movable sections connected by a shock absorber, and the fixed antenna is carried by the upper part of the shock strut on the movable section which is integral with the aircraft fuselage;

the fixed antenna is carried by the aircraft fuselage;

said radio-frequency transmission means are adapted for the radio-frequency transmission of a power signal for supplying the or each pressure measuring sensor;

it comprises a plurality of sensors associated with a plurality of movable antennas, and the transmission means comprise means for discriminating between the signals emitted from each movable antenna; and the transmission frequency is between 100 kHz and 150 kHz.

The invention also relates to an aeroplane comprising a pressure measuring installation as hereinbefore defined.

BRIEF DESCRIPTION OF THE DRAWINGS

The invention will be better understood from reading the description that follows, which is provided solely by way of example and with reference to the drawings, wherein.

DESCRIPTION OF THE PREFERRED EMBODIMENTS

Figure 1:
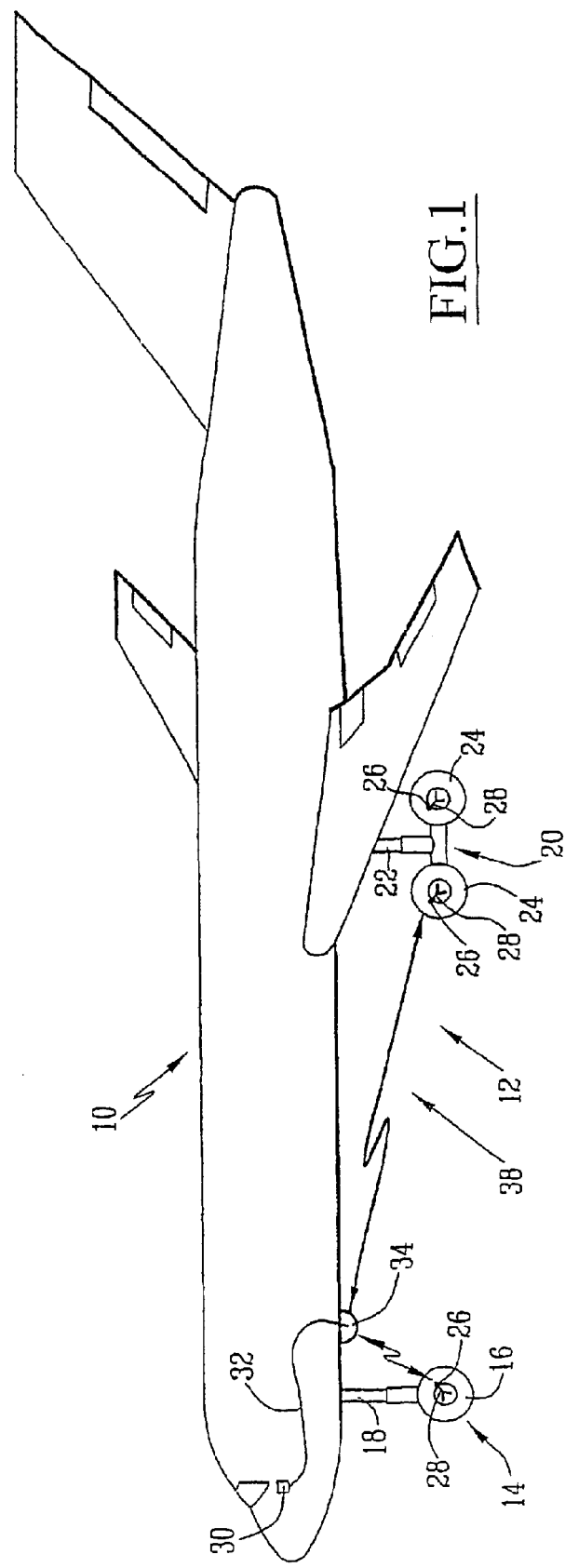
FIG. 1 is a diagrammatic view of an aeroplane fitted with an installation for measuring the pressure of a tyre according to the invention.

The aeroplane 10 shown in FIG. 1 is fitted with an installation 12 for measuring the pressure of each of the tyres of the aeroplane wheels. As known per se, the aeroplane has at the front a landing gear element 14 comprising a number of wheels 16 arranged at the free end of a shock strut 18. Similarly the aeroplane comprises, underneath each wing, a landing gear element 20 comprising a shock strut 22 at the end of which are mounted a number of wheels 24.

Each shock strut 18, 22 of the landing gear elements 14, 20 comprises two successive sections which are movable relative to one another and joined together by a shock absorber.

Each tyre fitted to a wheel 16, 24 of the aeroplane is associated with a pressure sensor generally designated 26.

As known per se, the pressure sensor is borne for example by the rim of the wheel.

Each pressure sensor 26 is connected to a rotary antenna generally designated 28. This antenna 28 is fixedly attached to the rim and is mounted to rotate with the wheel relative to the shock strut of the landing gear element carrying the wheel.

Inside the aeroplane and especially in the cockpit there is a unit 30 for operating on the pressure measurement in each tyre of the aeroplane. This operating unit 30 comprises, for example, a set of displays informing the pilot of the pressure level in each tyre.

This operating unit 30 is connected by a data transmission cable 32 to a fixed antenna 34 adapted to receive and transmit data from and to the antennas 28 associated with each sensor 26 mounted on the wheels of the aeroplane.

According to the invention, the fixed antenna 34 is carried by the structure of the aeroplane, at a spacing from each wheel, at least in the upper part of the shock strut of each landing gear element carrying a wheel.

More precisely, in the embodiment in FIG. 1, the fixed antenna 34 is fixed under the fuselage of the aircraft, in the front region thereof, close to the aircraft cockpit.

Figure 2:
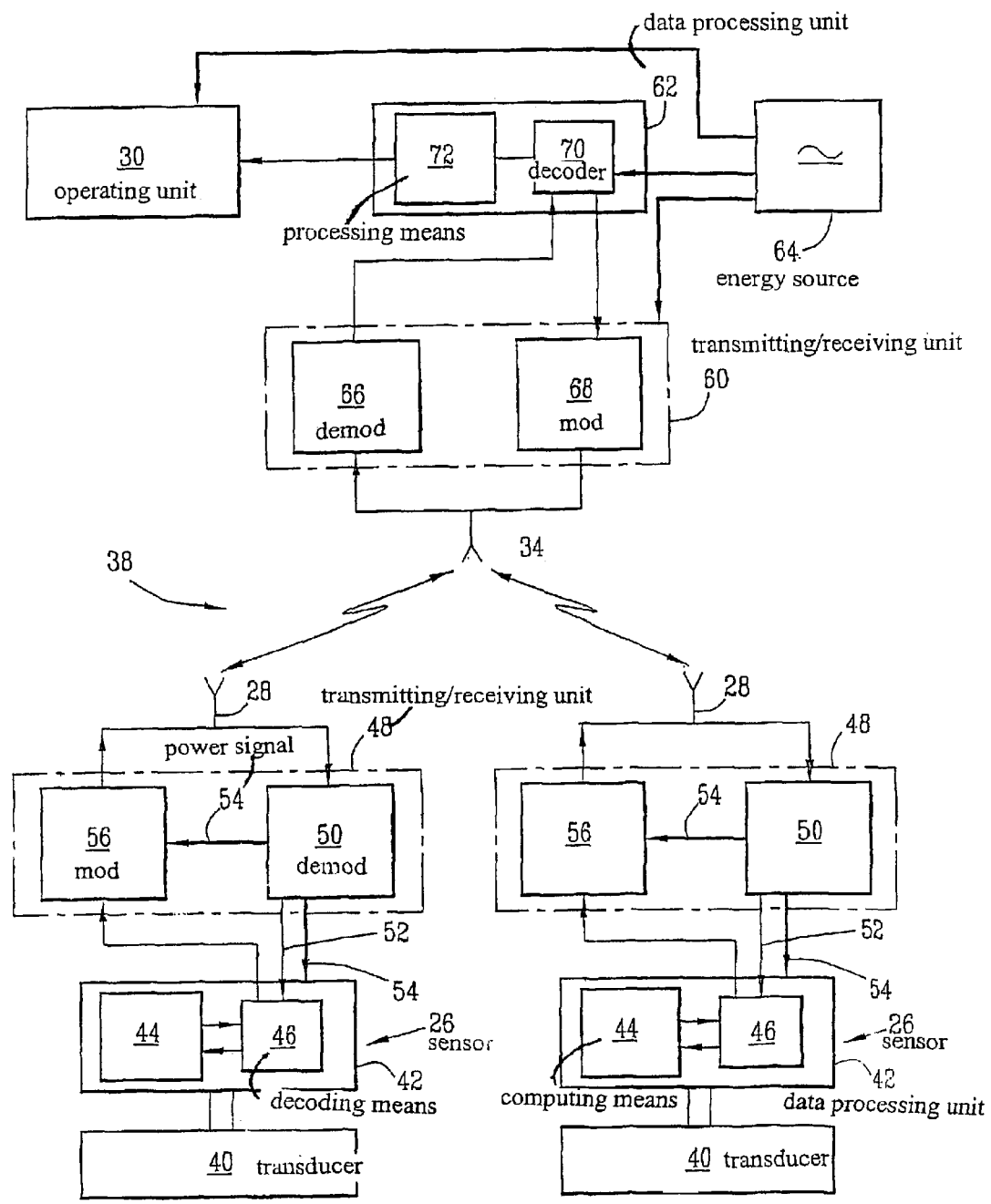
FIG. 2 is a diagrammatic view of the installation for measuring the pressure in two separate tyres of the same landing gear of an aeroplane.

FIG. 2 shows the electronic structure of the radio-frequency data transmission means which permit communication between each of the pressure sensors and the operating unit 30. These transmission means are generally designated 38.

In this Figure, only two sensors 26 and their associated movable antenna 28 are shown.

Each sensor 26 comprises a transducer 40 adapted to convert the pressure inside the tyre into an electric signal. In addition, the sensor 26 comprises a data processing unit 42 comprising computing means 44 and coding and decoding means 46.

The processing unit 42 is connected to a transmitting/receiving unit 48 to which the movable antenna 28 is connected.

The transmitting/receiving unit 48 comprises a demodulation stage 50 adapted to produce, from the radio-frequency signal received by the antenna 28, on the one hand a data signal 52 addressed to the coding and decoding means 46 and, on the other hand, a power signal 54 which supplies the data processing unit 42 on the one hand and all the stages of the transmitting/receiving unit 48.

The electric power sent by the demodulation stage 50 comes from the radio-frequency signal received. This radio-frequency signal is thus adapted for power transmission. It has, for example, a frequency of between 100 kHz and 150 kHz. This frequency is preferably 125 kHz.

The coding and decoding means 46 are adapted to interpret a pressure measurement command received from the cockpit through the radio-frequency communication.

In addition, the coding and decoding means 46 are adapted to code a pressure value produced by the processing means 44 for reading the transducer 40. This coding is carried out in particular in order to add to the pressure value, in the coded message, an identifier for the sensor 26, so that the pressure measurement value can be associated with a tyre.

Moreover, the transmitting/receiving unit 48 comprises a modulating stage 56 for the signal, which is adapted to convert the coded message coming from the coding and decoding means 46 into a signal suitable for radio-frequency transmission from the antenna 28. The modulation stage 56 is connected for this purpose to the antenna 28 in order to send the modulated signal to the fixed antenna 34.

The antenna 34 is connected, like each antenna 28, to a transmitting/receiving unit 60. The latter is connected to a data processing unit 62, which is in turn connected to the unit operating on the values 30. This operating unit consists of a display, for example.

In addition, the transmitting/receiving unit 60, the data processing unit 62 and the operating unit 30 are all supplied by an electrical energy source 64. This supply is provided for example through the aeroplane's own power distribution network.

The transmitting/receiving unit 60 comprises a demodulation stage 66 which makes it possible to receive the modulated signal coming from the antenna 34 and to form from it a digital baseband signal which can be utilised by the data processing unit 62.

Similarly, the communication unit 60 comprises a modulation stage 68 adapted to shape a signal coming from the data processing unit 62. In addition, this modulation stage 68 is adapted to combine, in a modulated signal, the data coming from the data processing unit 62 and a power signal for supplying the measuring sensors associated with the tyres.

The data processing unit 62 comprises coding and decoding means 70 for identifying, in the signal coming from the demodulating means 66, the origin of the pressure measurements as a function of the code provided by the pressure sensor which has sent the information. Moreover, the coding and decoding means 70 effect the coding of the pressure requests sent to the modulating module 68 so that the request will be recognised by only one of the sensors.

The data processing unit 62 also comprises processing means 72 for shaping the pressure measurements received so that they can subsequently be processed by the operating means 30.

In order to obtain a pressure measurement, the data processing unit 62 generates a request with a code appropriate to the sensor for the tyre whose pressure is to be recorded. This coded signal is modulated by the modulating stage 68.

Each of the sensors 26 receives the signal emitted by the antenna 34. The demodulation stage 50 of each sensor 26 carries out the demodulation of the signal, which is then sent to the data processing unit 42 and particularly to the coding and decoding means 46. If the request received contains a code which is recognised by the processing unit 42, the pressure measurement value returned by the transducer is shaped by the processing means 42 and encoded by the unit 46 before being modulated by the stage 56 for transmission. After this, the signal thus modulated is sent from the antenna 28 to the antenna 34.

If the sensor 26 does not recognise the request sent to it, it does not send any data back to the antenna 34.

The signal received by the antenna 34 is demodulated by the demodulation stage 66, then sent to the coding and decoding means 70, which identify the sensor that has carried out the pressure measurement. Thanks to the processing means 72, the pressure value is made available to the pilots of the aircraft by being displayed on the means 30 which operate on the pressure measurement value.

Figure 3:
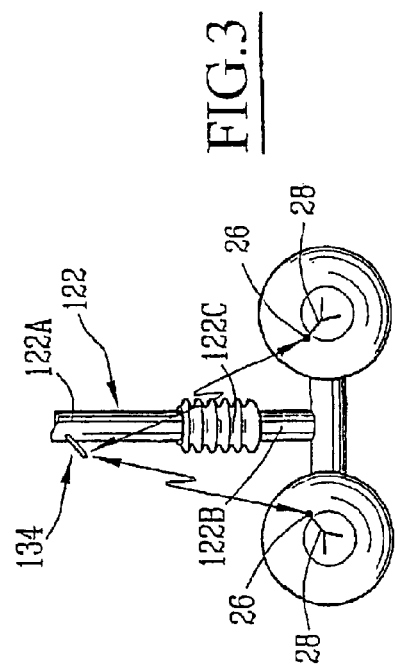
FIG. 3 is a diagrammatic view of an element of the landing gear of an aeroplane on which is mounted an alternative embodiment of a pressure measuring installation according to the invention.

FIG. 3 shows an alternative embodiment of the installation according to the invention.

In this embodiment, the fixed antenna designated 134, which is analogous to the fixed antenna 34, is located on the upper part of the shock strut 122 of the landing gear element. In particular, it is borne by the section 122A which is fixedly attached to the aircraft fuselage.

As before, each tyre is associated with a pressure sensor 26 connected to a movable antenna 28.

In this embodiment, as in the previous one, a radio-frequency transmission is established between the rotating antenna 28 on each wheel and the fixed antenna 134. This radio-frequency transmission ensures both transmission of data and transmission of energy to supply the sensors.

The shock strut 122 comprises two successive sections 122A, 122B connected by a shock-absorbing element 122C.

In the embodiments in FIGS. 1 and 3, the movable antennas 28 and fixed antennas 34 or 134 are mounted at a spacing from one another, and particularly on either side of the shock absorbing element of the landing gear. Thus, it will be seen that there are no wires running along the length of the shock absorber, thus reducing the risk of the cable breaking.

What is claimed is:

1. Installation (12) for measuring the pressure of at least one tire of a wheel (16, 24) of an airplane (10), comprising:
   at least one pressure measuring sensor (26) associated with a tire;
   a unit (30) operating on the pressure measurement, provided in the airplane (10); and
   radio-frequency transmission means comprising on the one hand, for the at least one pressure measuring sensor, a revolving antenna (28) borne by the wheel (16, 24) and connected to the at least one pressure measuring sensor (26) and, on the other hand, a fixed antenna (34; 134) connected by a conductive cable (32) to the unit (30) operating on the pressure measurement,
   characterized in that the fixed antenna (34; 134) is adapted to be carried by the structure of the airplane at a spacing from each wheel (16, 24) at least in an upper part of the shock strut (18, 20; 122) of a landing gear element (14, 20) carrying the wheel.

2. Measuring installation according to claim 1, characterized in that the sock strut (18, 20; 122) has two movable sections (122A, 122B) connected by a shock absorber (122c), and the fixed antenna (134) is carried by the upper part (122a) of the shock strut (122) on the movable section (122A) which is integral with the aircraft fuselage.

3. Measuring installation according to claim 1 characterized in that the fixed antenna (34) is carried by the aircraft fuselage.

4. Installation according to claim 1, characterized in that said radio-frequency transmission means are adapted for the radio-frequency transmission of a power signal for supplying the at least one pressure measuring sensor (26).

5. Installation according to claim 1, further comprising a plurality of sensors (26) associated with a plurality of movable antennas (28), and wherein the transmission means comprise means for discriminating between the signals emitted from each movable antenna (28).

6. Installation according to claim 1, characterized in that the transmission frequency is between 100 kHz.

7. Airplane comprising an installation for measuring the pressure of at least one tire of a wheel according to claim 1.

* * * * *